(12) United States Patent
Motamedi et al.

(10) Patent No.: US 6,992,824 B1
(45) Date of Patent: Jan. 31, 2006

(54) EFFICIENT WAVE PROPAGATION FOR TERAHERTZ IMAGING AND SENSING

(76) Inventors: Manouchehr E. Motamedi, 756 Pasco De Leon, Newbury Park, CA (US) 91320; Ali E. Dabiri, 2290 Middleton Way, San Diego, CA (US) 92109

( * ) Notice: Subject to any disclaimer, the term of this patent is extended or adjusted under 35 U.S.C. 154(b) by 66 days.

(21) Appl. No.: 10/746,440

(22) Filed: Dec. 27, 2003

(51) Int. Cl.
*G02B 5/18* (2006.01)
(52) U.S. Cl. .................. 359/569; 359/900; 359/566; 359/565
(58) Field of Classification Search ............. 359/569, 359/571, 575, 566, 565, 900
See application file for complete search history.

(56) References Cited

U.S. PATENT DOCUMENTS

| | | | |
|---|---|---|---|
| 5,995,285 A * | 11/1999 | Unno | 359/565 |
| 6,266,192 B1 * | 7/2001 | Sekine et al. | 359/569 |
| 6,441,793 B1 * | 8/2002 | Shea | 343/753 |
| 2004/0010196 A1 * | 1/2004 | Wang et al. | 600/476 |

OTHER PUBLICATIONS

M. E. Motamedi, "Micro-Opto-Electro-Mechanical Systems", *Opt. Eng.* 36, 1280-1281 (1997).

W. Daschner, P. Long, R. Stein, C. Wu, S.H. Lee, "Cost-effective mass fabrication of multilevel diffractive optical elements by use of a single optical exposure with a gray-scale mask on high-energy beam-sensitive glass", Appl. Opt., 36, 4675-4680 (1997).

E. W. Becker, W. Ehrfeld, D. Munchmeyer, H. Betz, A. Heuberger, S. Pongratz, W. Glashauser, H. J. Michel, R. Von Siemens, "Production Of Separation-Nozzle Systems For Uranium Enrichment By A Combination Of X-Ray-Lithography And Galvanoplastics" *Naturwissenschaften* 69, 520-523 (1982) Abstract only.

M. E. Motamedi, W. J. Gunning, M. P. Griswold, R. E. Knowlden, "Silicon Microlenses for Enhanced Optical Coupling to Silicon Focal Planes," proceeding of SPIE, vol. 1544, pp. 22-32, Jul. 1991.

* cited by examiner

*Primary Examiner*—Fayez G. Assaf

(57) ABSTRACT

A method of wave propagation from 100–10000 GHz. The currently disclosed method and apparatus adapts micro-opto-electro-mechanical systems (MOEMS) technologies and processes to construct Kinoform optical components from microwave to terahertz range. The method uses induced coupled plasma (ICP) and gray scale processes for upper terahertz band; LIGA-based high aspect ratio (HAR) and gray scale processes are for the mid band; and computer numerical control (CNC) for lower band. In all cases, the thickness of any processed components is about the respective wavelength and system efficiency is about 95%. A Kinoform lens element is designed at 5000 GHz. However, the method is applicable for the entire terahertz band.

12 Claims, 2 Drawing Sheets

EFFICIENT WAVE PROPAGATION FOR TERAHERTZ IMAGING AND SENSING

FIELD OF THE DISCLOSED METHOD AND APPARATUS

This method and apparatus is related to efficient wave propagation for terahertz systems and more particularly to terahertz imaging and sensing.

BACKGROUND

Terahertz waves are a segment of electromagnetic waves, which are bounded between millimeter waves (less than $1\times10^{11}$ Hz) and photonics waves (greater than $1\times10^{13}$ Hz). The electromagnetic frequencies lower than terahertz band are covering mm waves (microwaves), while the electromagnetic frequencies higher than terahertz band are covering near infrared through visible spectrum.

Terahertz waves band has been used for time and frequency domains imaging. Major applications of terahertz are spectroscopy in atmospheric science and in astronomy, imaging for burn diagnostics, tomography, biomedical, medical diagnostics, screening for weapon, explosives, biohazard, and finally imaging of concealed objects. The discussion of these applications are shown in a book entitled "Sensing with terahertz radiations" edited by D. Mittleman.

Terahertz wave frequencies in the range of 100 to 10000 GHz suffer high insertion losses during wave shaping, multiplexing, and focusing. Current available optics for Terahertz imaging is bulky and designed on refraction principle where in terahertz optics diffractive effects can dominate in ray propagation. Kinoform optics is based on diffraction and support system miniaturization, which in most cases is the only solution for development of portable systems.

One of the problems with the current systems is the optical components that have low efficiency. As a result, the weight of the system is too great for many practical applications. One more deficiency in the prior art is their inability to be packed with 100 percent fill factor. This disadvantage is noticeable when terahertz imaging requires a lens array.

BRIEF SUMMARY

The present disclosed method and apparatus employs micro-opto-electro-mechanical systems (MOEMS) technology, gray scale, induced coupled plasma (ICP), lithography and galvonoforming (LIGA) used for high aspect ratio (HAR) micromachining, and computer numerical control (CNC) machining processes to design and produce terahertz optical components with Kinoform shape for imaging and sensing applications. The disclosed method and apparatus is distinguished from other optical components by significant contribution to overall system efficiency and size reduction for development of portable devices.

The presently disclosed method and apparatus is the solution to miniaturization and revolutionizes development and manufacturing of terahertz portable systems. The disclosed method and apparatus covers the entire terahertz frequency band from 100 GHz to 10,000 GHz. The MOEMS technology, ICP, and gray scale processes are applicable to upper terahertz band; LIGA-based HAR and gray scale processes are applicable to the mid range band and CNC for lower band. In all cases, the thickness of quasi-optical elements is on the order of the respective terahertz wavelength and system efficiency has potential to reach 95%.

Producing terahertz Kinoform optics is not similar to prior art Kinoform lens that has been developed on glass and some known materials.

The proposed Kinoform optical components theoretically have 100% efficiency, and their thicknesses are on the order of operational wavelength. This property helps tremendously to reduce the weight of the system. For example, a terahertz lens designed based on presently disclosed method and apparatus could have speed as fast as F/0.4. This is a very high speed lens which is owed to terahertz wavelength being orders of magnitudes longer than visible optics where prior art lenses are refractive and their speed are not controlled by coherent property of electromagnetic radiation. One more advantage of terahertz Kinoform lenses over the prior art is their potential to be packed with 100 percent fill factor. This advantage is noticeable when terahertz imaging requires applications of lens array.

A better understanding could be achieved with reference to Detailed Description of the disclosed method and apparatus and with reference to the drawings. This description represents a particular case to realize the disclosed method and apparatus and is not intended to define the invention, but merely to provide adequate support for the claims appended hereto. Accordingly, the invention is defined solely by the claims to the invention appended hereto.

DETAILED DESCRIPTION

Figure 1:
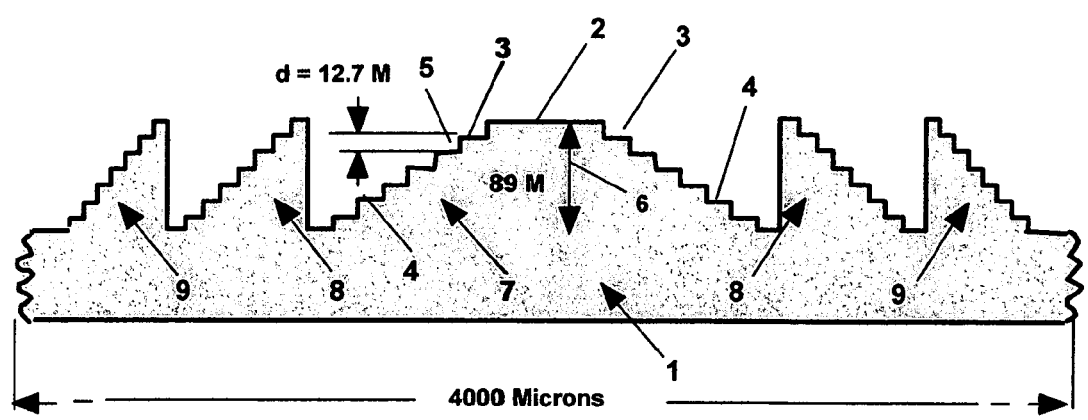
FIG. 1: is a schematic drawing of a typical terahertz quasi optics focusing-lens for mid range band. It is a partial structure of only three zones of 8 required zones. It describes a process method based on staircase approximation. The dimensions are exaggerated for clarity.

The presently disclosed method and apparatus includes a method to design the terahertz optical profile in the entire terahertz spectrum. Structural design for one segment of spectrum is shown as one example of the disclosed method and apparatus.

The terahertz quasi-optical elements applicable for high frequency imaging above 5000 GHz are in micro scale and getting to the sizes, which are possible to practically process them, the same way that IC chips are processed. For these range of frequencies, micro-opto-electro-mechanical systems (MOEMS) technology as described in special issue of Optical Engineering Journal by M. E. Motamedi; ICP, as described in article entitled "SCREAM MicroElectroMechanical Systems" by N. C. MacDonald; and gray scale, as described in article "Cost-effective mass fabrication of multilevel diffractive optical elements by use of a single optical exposure with a gray-scale mask on high-energy beam-sensitive glass" by W. Daschner, P. Long, R. Stein, C. Wu, S. H. Lee; can be used to design all terahertz optical components as Kinoform optics. For terahertz frequencies in mid range (500 to 5000 GHz), the structure could be produced by x-ray lithography using LIGA-based HAR process as described in article "Production Of Separation-Nozzle Systems For Uranium Enrichment By A Combination Of X-Ray-Lithography And Galvanoplastics" by E. W.

Becker, W. Ehrfeld, D. Munchmeyer, H. Betz, A. Heuberger, S. Pongratz, W. Glashauser, H. J. Michel, R. Von Siemens.

For the disclosed method and apparatus, a terahertz wave of 5000 GHz, almost at the middle of the terahertz frequency band and Rexolite material for substrate is selected. Rexolite has refractive index of 1.59 and has relative low absorption in selected frequency band. We calculated the device structure to show the dimensions that could fit in a size of MOEM chip. Similar calculation can be used for optical processing of terahertz imaging system in all terahertz bands. The substrate is preferably selected to have low absorption and relatively larger index of refraction. In lower than 5000 GHz frequencies, the device sizes become larger. That makes them impractical to be processed by standard ICP process and MOEMS technology. In some cases where the terahertz frequency is much lower (less than 500 GHz), use of computer numerical control (CNC) and mechanically machining the structure is preferred. After the component is machined, it can be replicated for high volume manufacturing.

We use the well-known principle of binary optics design, as described in an article entitled "Silicon Microlenses for Enhanced Optical Coupling to Silicon Focal Planes," by M. E. Motamedi, W. J. Gunning, M. P. Griswold, R. E. Knowlden, hereafter referred to as the "Motamedi binary optics design technique". The same principles are used for designing binary optical components by staircase approximation method. In the preferred embodiment, it is acceptable to use only 8 phase levels to approximate the device structure very close to Kinoform shape (diffractive blazed grating), where the optical efficiency is on the order of 95%. In an alternative embodiment, increasing the phase levels produces a true Kinoform having diffraction efficiency of 100%. However, in the preferred embodiment, the number of phase levels is 8. The device structure is flat to the near wavelength and it is shaped in consecutive circular zones as a function of what size diameter lens is required for the system. Each zone has eight radii and seven quantized depths (d). For each depth, a variable depth x is defined. For the first depth, the variable x is equal to 1, for the second depth the variable x is equal to 2, etc. For each depth, the value of the depth is x times d. Accordingly, the first depth has a quantized value of d, and the second depth has a value of 2 times d and so on.

The following are typical dimensions and some definitions from the principle of binary optics design, and more particularly, from the Motamedi binary optics design technique.

| | |
|---|---|
| Assume lens diameter | $D = 4000\ \mu m$ |
| Assume focal length | $Fl = 4000\ \mu m$ |
| Lens F-number becomes | $Fn = Fl/D = 1\ (F/l)$ |
| Terahertz frequency selected | $Fr = 5000$ GHz |
| Terahertz center wavelength | $\lambda c = 60\ \mu m$ |
| Index of refraction for Rexolite | $n = 1.59$ |
| Assume 8 phase-level diffraction | $Np = 8$ |

The structural design of the preferred embodiment and the particular values for each of the parameters to be determined in order to manufacture a Kinoform optical component according with the presently disclosed method and apparatus can be calculated using the well-know formulas shown in an article entitled "Silicon Microlenses for Enhanced Optical Coupling to Silicon Focal Planes," by M. E. Motamedi, et al. Here are the major design formulas:

| | | |
|---|---|---|
| Critical dimension for 8 phase levels | $CD = \lambda c\ Fn/4$ | (1) |
| Diffraction circle | $Dc = 2\ \lambda c\ Fn$ | (2) |
| Quantized etch depth | $d = \lambda c/8\ (n - 1)^{-1}$ | (3) |
| Number of required zones | $Nz = D^2/8\ \lambda c\ Fl$ | (4) |
| Radius of each progressive ring | $Rp = (2\ Fl\ (p\ \lambda c/8) + (p\ \lambda c/8)^2)^{0.5}$ | (5) |

Using constants introduced for terahertz frequency of 5000 GHz, values of CD, Dc, d, and Nz are calculated:

$CD = 15\ \mu m$ $Dc = 120\ \mu m$ $d = 12.71\ \mu m$ $Nz = 8$ Zones

Using above calculated values and formula (5), the dimensions of structure profile are calculated and listed in Table 1. Table 1 shows the radius of consecutive rings in $\mu m$ for four zones starting from center. Each zone is associated with 8 radius. The center circle is flat and has radius of 245.1 $\mu m$ indicated by the first row of Table 1.

TABLE 1

| Consecutive Rings | Zone Number | Phase Level | Radius of the ring in $\mu m$ |
|---|---|---|---|
| 1 | 1 | 1 | 245.1 |
| 2 | 1 | 2 | 346.7 |
| 3 | 1 | 3 | 424.9 |
| 4 | 1 | 4 | 490.8 |
| 5 | 1 | 5 | 549.0 |
| 6 | 1 | 6 | 601.7 |
| 7 | 1 | 7 | 650.2 |
| 8 | 1 | 8 | 695.4 |
| 9 | 2 | 1 | 737.9 |
| 10 | 2 | 2 | 778.2 |
| 11 | 2 | 3 | 816.6 |
| 12 | 2 | 4 | 853.3 |
| 13 | 2 | 5 | 888.5 |
| 14 | 2 | 6 | 922.5 |
| 15 | 2 | 7 | 955.3 |
| 16 | 2 | 8 | 987.1 |
| 17 | 3 | 1 | 1018.0 |
| 18 | 3 | 2 | 1048.0 |
| 19 | 3 | 3 | 1077.2 |
| 20 | 3 | 4 | 1105.7 |
| 21 | 3 | 5 | 1133.5 |
| 22 | 3 | 6 | 1160.7 |
| 23 | 3 | 7 | 1187.3 |
| 24 | 3 | 8 | 1213.4 |
| 25 | 4 | 1 | 1239.0 |
| 26 | 4 | 2 | 1264.1 |
| 27 | 4 | 3 | 1288.8 |
| 28 | 4 | 4 | 1313.0 |
| 29 | 4 | 5 | 1336.9 |
| 30 | 4 | 6 | 1360.4 |
| 31 | 4 | 7 | 1383.5 |
| 32 | 4 | 8 | 1406.3 |

FIG. 1 shows a schematic of cross-section of a partial structure of a terahertz quasi-optics lens (TQOL). The drawing is not to scale and the staircases are shown highly magnified in vertical direction for clarity of description. The TQOL 1 includes a preferably flat central surface 2, which is preferably circular. This central surface 2 preferably has a diameter of 490.2 $\mu m$ (see the first row of Table 1). Diffractive zones 7, 8, and 9 surround the central surface 2. As shown in FIG. 1, TQOL 1 covers only three such diffractive zones 7, 8, and 9. However, it will be understood that there are several concentric diffractive zones in the preferred TQOL. For example, eight such diffractive zones are included in one such preferred embodiment. Accordingly, FIG. 1 represents a partial structure of the TQOL 1. One particular TQOL structure which comprises 8 diffractive zones consists of 63 concentric annuli. As shown in FIG. 1, each concentric diffractive zone 7, 8, and 9 comprises eight concentric annuli. For example, the first diffractive zone 7 includes a first annuli 3 and a fifth annuli 4, among others as can be seen in FIG. 1. The annuli radiate outward from the central surface 2 with each annuli getting larger as they get further from the central surface 2. Each annuli lies on a unique horizontal plane. The horizontal plane upon which each annuli lies is preferably parallel to, and lower than, the horizontal plane of each of the smaller annuli 3 within the same diffractive zone. The first annulus 3 has an outer radius of 346.7 $\mu$m defined by the data of the second ring in Table 1. In the same way, we can define the horizontal dimensions of the rest of the structure. For instance, the fifth annulus 4 has an outer radius of 601.7 $\mu$m defined by the data of the sixth ring and so on. The quantized etch depth 5 is the same for the entire structure and it is 12.7 $\mu$m. The TQOL structure thickness 6 is 89 $\mu$m, which is comparable to 60 $\mu$m terahertz wavelength. The right column of Table 1 has four segments of data. Each segment covers one diffractive zone. Staircases of the second and third diffractive zones 8 and 9 are defined by the second and third consecutive segments respectively.

Figure 2:
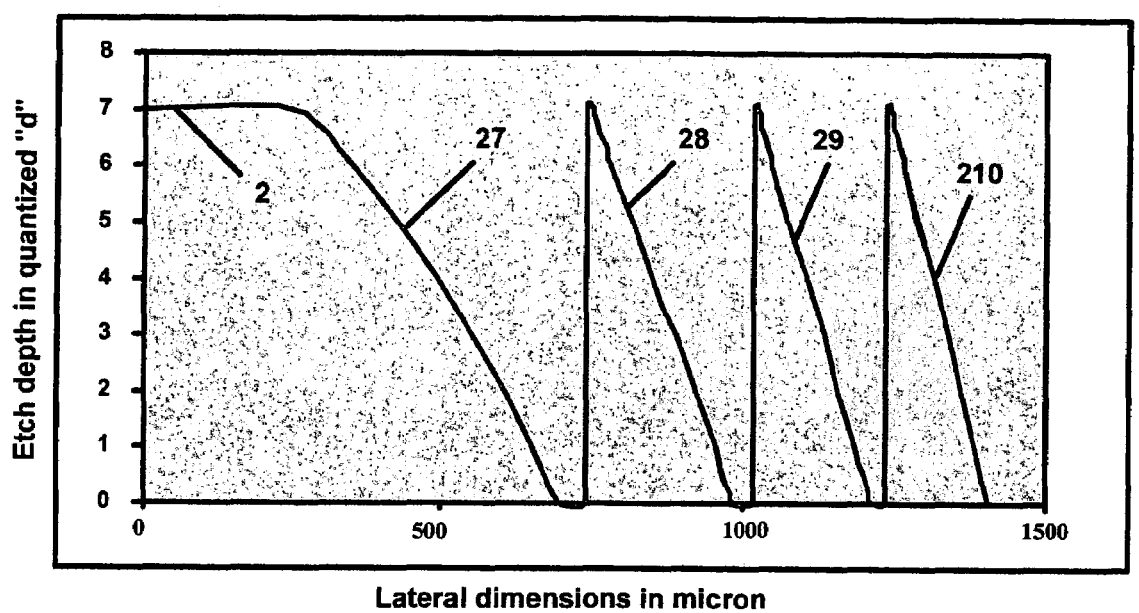
FIG. 2: is a plot of structures of the device proposed in FIG. 1. The curves are traced from all the data calculated and given in Table 1. It demonstrates that using only 8-phase level for the proposed device is a close approximation to a Kinoform shape quasi-optic element holding up to 95 percent diffraction efficiency.

Despite the exaggerations shown herein for the sake of clarity, the staircases are very fine and the TQOL is very close to Kinoform structure. To demonstrate this statement, we traced the calculated data points on the right hand side of the structure sketched in FIG. 1. FIG. 2 shows the profile of the first four zones (27, 28, 29, 210) of the proposed TQOL. Here again the vertical scale is magnified for the clarity. The fourth zone 210, which is shown in FIG. 2, is not shown in FIG. 1.

The example structure discussed in FIG. 1 is mostly practical in the case of LIGA. At higher terahertz frequencies, it is more proper to use MOEMS and ICP, which the staircase profile should be processed by IC Lithography. In this case, the eight phase levels are produced by three masks where the coordinates should be calculated similarly.

It should be understood that the method and apparatus disclosed above is provided merely as an example and is not to be taken as a limitation on the claimed invention, which is defined solely by the claims appended hereto.

We claim:

1. A method of designing terahertz optical components for use in the range of 100–10,000 GHz as Kinoform optics, the method including:

a. calculating a device structure to determine dimensions that fit within a micro-opto-electro-mechanical systems (MOEMS) chip;
   b. selecting a substrate material having low absorption and index of refraction of approximately 1.59 and;
   c. using a Motamedi binary optics design technique to design binary optical components by staircase approximation.

2. A method of fabricating a terahertz optical component for use in the range of 100–10,000 GHz as a Kinoform optics device, the method including:

a using a Motamedi binary optics design technique to fabricate binary optical components by staircase approximation, and
   b. fabricating the terahertz optical component from a substrate based upon the dimensions determined from the binary optics design, the substrate having low absorption and index of refraction of approximately 1.59.

3. The method of claim 2, wherein the substrate is Rexolite.

4. A terahertz optical component designed by the method of claim 1.

5. A terahertz optical component fabricated by the method of claim 2.

6. The method of claim 2, wherein for terahertz frequencies in mid range (500 to 5000 GHz), the structure is fabricated by x-ray lithography using a lithography and galvonoforming (LIGA)-based high aspect ratio (HAR) micromachining process.

7. The method of claim 2, wherein for frequencies much lower than 500 GHz, fabrication is performed by use of computer numerical control (CNC) and mechanically machining.

8. The method of claim 2, wherein for terahertz frequencies in the range above 5000 GHz, the structure is fabricated by micro-opto-electro-mechanical systems (MOEMS) technology and gray scale.

9. The method of claim 2, wherein for terahertz frequencies in the range above 5000 GHz, the structure is fabricated by induced coupled plasma (ICP).

10. The terahertz optical component of claim 4 or 5, wherein the component structure is flat to the near wavelength and shaped in consecutive circular zones.

11. The terahertz optical component of claim 10, wherein each zone has eight radii and seven quantized depths.

12. The terahertz optical component of claim 11, wherein each depth x has a value of x times d.

* * * * *